US012764659B2

(12) United States Patent
Shafin et al.

(10) Patent No.: US 12,764,659 B2
(45) Date of Patent: Oct. 13, 2026

(54) METHOD AND APPARATUS FOR NSTR OPERATION WITH MULTIPLE TWT OVER MULTIPLE LINKS

(71) Applicant: Samsung Electronics Co., Ltd., Suwon-si (KR)

(72) Inventors: Rubayet Shafin, Allen, TX (US); Boon Loong Ng, Plano, TX (US); Vishnu Vardhan Ratnam, Plano, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 453 days.

(21) Appl. No.: 18/182,204

(22) Filed: Mar. 10, 2023

(65) Prior Publication Data

US 2023/0292238 A1 Sep. 14, 2023

Related U.S. Application Data

(60) Provisional application No. 63/319,190, filed on Mar. 11, 2022.

(51) Int. Cl.
*H04W 52/02* (2009.01)
*H04W 74/04* (2009.01)

(52) U.S. Cl.
CPC ....... *H04W 52/0216* (2013.01); *H04W 74/04* (2013.01)

(58) Field of Classification Search
CPC . H04W 52/0216; H04W 74/04; H04W 76/15; H04W 84/12; H04W 52/0219;
(Continued)

(56) References Cited

U.S. PATENT DOCUMENTS

2021/0329547 A1 10/2021 Kim et al.
2021/0329721 A1 10/2021 Kim et al.
(Continued)

FOREIGN PATENT DOCUMENTS

WO 2022039482 A1 2/2022
WO 2023048472 A1 3/2023

OTHER PUBLICATIONS

Shafin et al, IEEE 802.11-22/0254r3, Feb. 11, 2022 (Year: 2022).*
(Continued)

*Primary Examiner* — Andrew W Chriss

(57) ABSTRACT

Methods and apparatuses for facilitating restricted TWT operation between multi-link devices (MLDs) across multiple links under non-simultaneous transmit/receive (NSTR) constraints. A non-access point (AP) MLD comprises a processor and stations (STAs), each comprising a transceiver configured to form links with APs of an AP MLD. First and second links form an NSTR link pair subject to NSTR constraints. First and second target wake time (TWT) schedules that have first and second TWT service periods (SPs), respectively, and associated first and second sets of traffic identifiers (TIDs), respectively, are established on the first and second links, respectively. The first and second TWT SPs have an overlapping portion. The processor is configured to determine, based on characteristics of the sets of TIDs, scheduling for traffic on the first and second links during the overlapping portion of the TWT SPs such that the NSTR constraints are not violated.

20 Claims, 12 Drawing Sheets

(58) Field of Classification Search
CPC ............ H04W 52/0229; H04W 72/569; H04L 5/0037; Y02D 30/70
See application file for complete search history.

(56) References Cited

U.S. PATENT DOCUMENTS

| | | | | |
|---|---|---|---|---|
| 2021/0410089 | A1 | 12/2021 | Choi et al. | |
| 2022/0078844 | A1 | 3/2022 | Cherian et al. | |
| 2022/0110053 | A1* | 4/2022 | Chu | H04W 52/0216 |
| 2023/0047705 | A1* | 2/2023 | Xin | H04W 74/0808 |
| 2023/0058871 | A1* | 2/2023 | Xin | H04W 52/0258 |
| 2023/0156687 | A1* | 5/2023 | Xia | H04W 74/0816 370/329 |
| 2023/0199641 | A1* | 6/2023 | Naik | H04W 76/15 370/318 |
| 2023/0199647 | A1* | 6/2023 | Xia | H04W 74/0808 370/311 |
| 2023/0199847 | A1* | 6/2023 | Xin | H04W 74/08 370/329 |
| 2023/0262770 | A1* | 8/2023 | Xin | H04W 74/0816 370/336 |
| 2024/0040634 | A1 | 2/2024 | Kim | |
| 2024/0244481 | A1* | 7/2024 | Viger | H04W 28/0278 |

OTHER PUBLICATIONS

Adame et al, "Time-Sensitive Networking in IEEE 802.11be: On the Way to Low-Latency WiFi 7", Sensors (Year: 2021).*

Lopez-Revantos et al, "Multi-Link Operation in IEEE 802.11be WLANs" (Year: 2022).*

Extended European Search Report issued Dec. 9, 2024 regarding Application No. 23767218.3, 10 pages.

IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pages.

IEEE P802.11be-D3.0 "Part 11: Wireless LAN Medium Access Control (MAC) and Physical Layer (PHY) Specifications—Amendment 8: Enhancements for extremely high throughput (EHT)" Jan. 2023, 999 pages.

International Search Report and Written Opinion issued Jun. 21, 2023 regarding International Application No. PCT/KR2023/003353, 7 pages.

Lu et al., "Discussion on 802.11be features to support TSN capabilities", doc.: IEEE802.11-21/0681r0, Apr. 2021, 10 pages.

* cited by examiner

METHOD AND APPARATUS FOR NSTR OPERATION WITH MULTIPLE TWT OVER MULTIPLE LINKS

CROSS-REFERENCE TO RELATED APPLICATION AND CLAIM OF PRIORITY

This application claims priority under 35 U.S.C. § 119(e) to U.S. Provisional Patent Application No. 63/319,190 filed on Mar. 11, 2022, which is hereby incorporated by reference in their entirety.

TECHNICAL FIELD

This disclosure relates generally to interference management in wireless communications systems that include multi-link devices. Embodiments of this disclosure relate to methods and apparatuses for resolving potential interference between overlapping transmissions scheduled on non-simultaneous transmit/receive link pairs of a multi-link device in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. The component of an MLD that is responsible for transmission and reception on one link is referred to as a station (STA).

Multi-link operation has two variations. The first type is simultaneous transmit/receive (STR) in which the STAs affiliated with the MLD can transmit and receive independent of each other. The second variation is non-simultaneous transmit/receive (NSTR) in which the links formed by the affiliated STAs do not form an STR link pair. If a link pair constitutes an NSTR link pair, transmission on one link can cause interference to the other link due to signal leakiness which the device's radio transceiver is unable to withstand. Consequently, two STAs forming an NSTR link pair cannot simultaneously transmit and receive frames. Since the STR mode of operation requires two or more radios with sufficient isolation, it is expected that AP MLDs will have STR capabilities while non-AP MLDs can potentially be not STR capable.

Target wake time (TWT) is one of the most important features for power management in WI-FI networks, which was developed by IEEE 802.11ah and later adopted and modified into IEEE 802.11ax. With TWT operation, it suffices for a STA to only wake up at a pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

Restricted TWT (rTWT or r-TWT) operation is a newly introduced feature in IEEE 802.11be (WI-FI 7), which provides more protection for restricted TWT scheduled STAs in order to serve latency-sensitive applications in a timely manner. Restricted TWT is based on Broadcast TWT mechanisms, however, there are some key characteristics that make restricted TWT operation an important feature for supporting low-latency applications in next generation WLAN systems. Restricted TWT offers a protected service period for its member STAs by sending Quiet elements to other STAs in the basic service set (BSS) which are not members of the rTWT schedule, where the Quiet interval corresponding to the Quiet element overlaps with the initial portion of the restricted TWT service period (SP). Hence, it gives more channel access opportunities to the rTWT member scheduled STAs, which helps latency-sensitive traffic flows.

TWT operation would be essential for efficient power management for MLDs. Restricted TWT schedules can be set for MLDs for efficient power management.

SUMMARY

Embodiments of the present disclosure provide methods and apparatuses for facilitating restricted TWT operation between MLDs across multiple links under NSTR constraints in a WLAN.

In one embodiment, a non-AP MLD is provided, comprising STAs and a processor operably coupled to the STAs. The STAs comprise transceivers configured to form links with APs, respectively, the APs affiliated with an AP MLD. First and second links of the links form an NSTR link pair subject to NSTR constraints. A first TWT schedule that has a first TWT SP and an associated first set of traffic identifiers (TIDs) is established on the first link and a second TWT schedule that has a second TWT SP and an associated second set of TIDs is established on the second link, and the first and second TWT SPs have an overlapping portion. The processor is configured to determine, based on characteristics of the first and second sets of TIDs, scheduling for traffic on the first and second links during the overlapping portion of the TWT SPs such that the NSTR constraints are not violated. At least one of the transceivers is further configured to transmit or receive the traffic to or from the AP MLD.

In another embodiment, an AP MLD is provided, comprising APs and a processor operably coupled to the APs. The APs comprise transceivers configured to form links with STAs, respectively, the STAs affiliated with a non-AP MLD. First and second links of the links form an NSTR link pair subject to NSTR constraints. A first TWT schedule that has a first TWT SP and an associated first set of TIDs is established on the first link and a second TWT schedule that has a second TWT SP and an associated second set of TIDs is established on the second link, and the first and second TWT SPs have an overlapping portion. The processor is configured to determine, based on characteristics of the first and second sets of TIDs, scheduling for traffic on the first and second links during the overlapping portion of the TWT SPs such that the NSTR constraints are not violated. At least one of the transceivers is further configured to transmit or receive the traffic to or from the non-AP MLD.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a non-AP STA affiliated with a non-AP MLD may establish one or more restricted TWT schedules over one or more links between the AP MLD and the non-AP MLD. Furthermore, a non-AP MLD may establish restricted TWT schedules over multiple links that form NSTR link pairs within the same non-AP MLD.

Embodiments of the present disclosure further recognize that data transmission rules for NSTR link pairs require that the end times of physical layer protocol data units (PPDUs) transmitted on those links need to be aligned in order to prevent self-interference due to NSTR constraints. Accordingly, when multiple restricted TWT schedules are established on multiple links that form an NSTR link pair, the data transmission rules for NSTR link pairs may cause severe interruption to low-latency (or latency-sensitive) traffic flows by requiring alignment of PPDUs for latency-sensitive traffic that are scheduled during an overlapping portion of the restricted TWT SPs on the NSTR link pair.

Accordingly, embodiments of the disclosure provide mechanisms for resolving potential NSTR conflicts during restricted TWT operation across multiple NSTR links between an AP MLD and a non-AP MLD by prioritizing one TWT SP over another, for example based on the traffic identifiers (TIDs) negotiated for each TWT schedule, thereby facilitating restricted TWT operation across multiple links between an AP MLD and a non-AP MLD under NSTR constraints.

Figure 1:
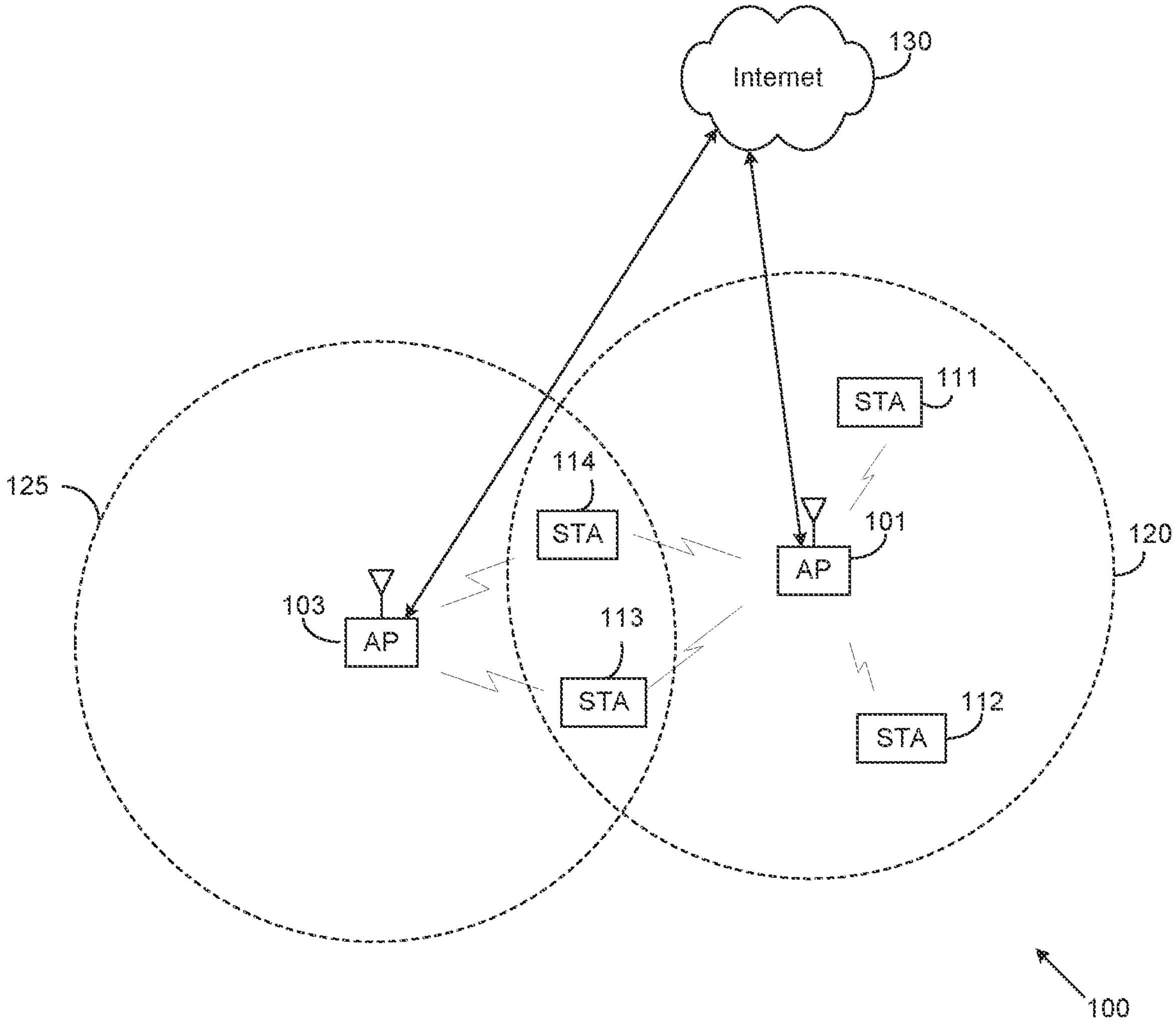
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating restricted TWT operation between MLDs across multiple links under NSTR constraints in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
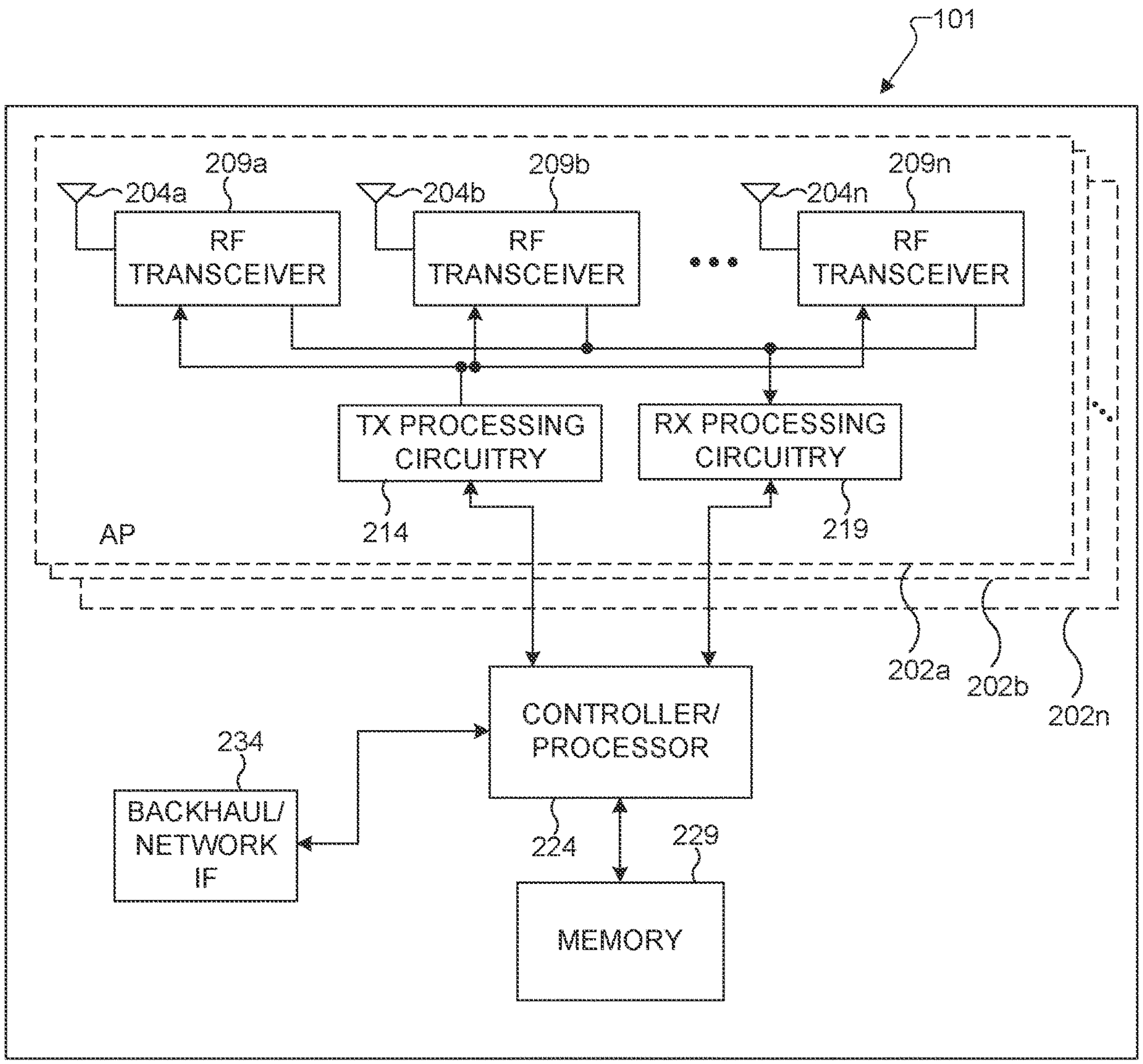
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs **202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234**.

The illustrated components of each affiliated AP **202*a*-202*n* may represent a physical (PHY) layer and a lower media access control (LMAC) layer in the open systems interconnection (OSI) networking model. In such embodiments, the illustrated components of the AP MLD 101** represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHz, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating restricted TWT operation between MLDs across multiple links under NSTR constraints in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connections. For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating restricted TWT operation between MLDs across multiple links under NSTR constraints in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
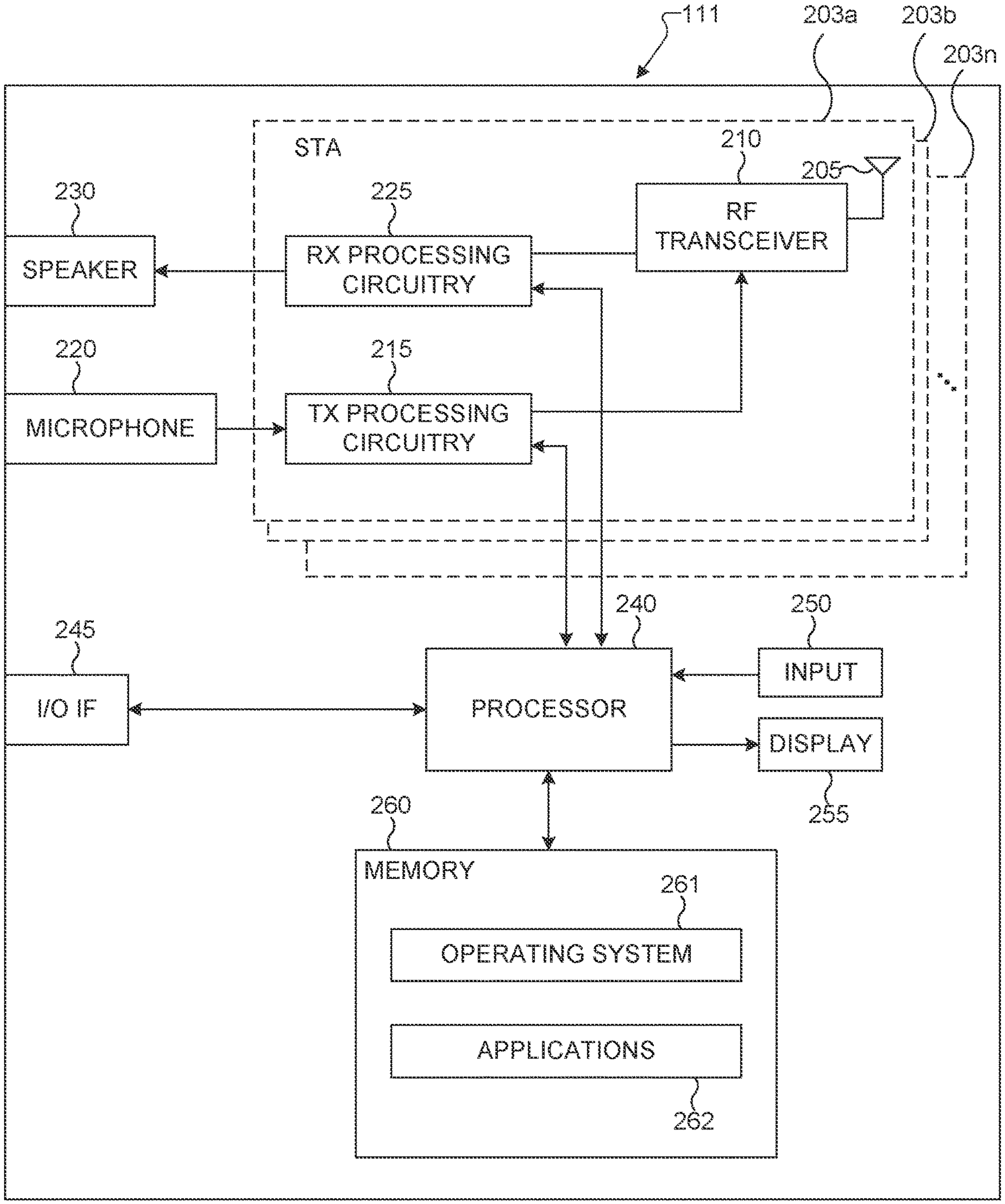
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203*a*-203*n* (which may be referred to, for example, as STA1-STAn). Each of the affiliated STAs 203*a*-203*n* includes antennas 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives, from the antennas 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antennas 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate restricted TWT operation between MLDs across multiple links under NSTR constraints in WLANs. In some embodiments, the controller/processor 240 includes at least one microprocessor or microcontroller.

The controller/processor 240 is also capable of executing other processes and programs resident in the memory 260, such as operations for facilitating restricted TWT operation between MLDs across multiple links under NSTR constraints in WLANs. The controller/processor 240 can move data into or out of the memory 260 as required by an executing process. In some embodiments, the controller/processor 240 is configured to execute a plurality of applications 262, such as applications for facilitating restricted TWT operation between MLDs across multiple links under NSTR constraints in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antennas 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Data transmission rules for an NSTR non-AP MLD, i.e., a non-AP MLD for which STAs affiliated with the non-AP MLD form one or more NSTR link pairs, are defined in 802.11be standards. According to current specifications, for PPDU transmission on a link that forms an NSTR link pair with other STAs affiliated with the same non-AP MLD, the end time of the PPDUs transmitted on those links need to be aligned in order to prevent self-interference at the non-AP MLD side due to NSTR constraints.

Figure 3:
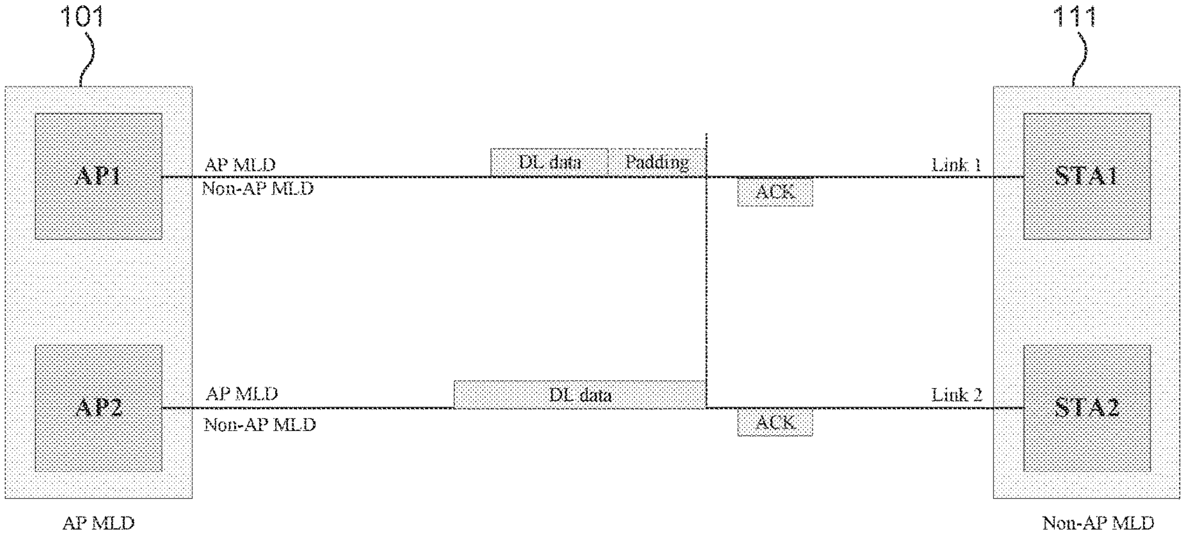
FIG. 3 illustrates an example of PPDU end time alignment through padding to avoid NSTR conflicts at a non-AP MLD according to embodiments of the present disclosure.

FIG. 3 illustrates an example of PPDU end time alignment through padding to avoid NSTR conflicts at a non-AP MLD according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs. For ease of explanation, it is understood that references to an AP MLD and a non-AP MLD in further embodiments below refer to the AP MLD 101 and non-AP MLD 111, respectively.

In the example of FIG. 3, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. The non-AP MLD is an NSTR non-AP MLD, i.e., Link 1 and Link 2 form an NSTR link pair. Moreover, in this illustration, both Link 1 and Link 2 are enabled links.

AP2 transmits a DL PPDU for STA2 on Link 2. Shortly after, AP1 transmits a DL PPDU to STA1 on Link 1. The DL PPDU transmission on Link 1 finishes earlier than the end time of the DL PPDU transmitted on Link 2. In this situation, in order to avoid NSTR self-interference at the non-AP MLD, according to the current 802.11be specification, AP1 will align the end time of the DL PPDU on Link 1 with the end time of the DL PPDU on Link 2. In this example, the alignment is performed by appending extra padding bits within the DL PPDU transmitted on Link 1.

If multiple restricted TWT schedules are established on multiple links that form NSTR link pairs and if PPDUs transmitted during a restricted TWT SP on one link (e.g., Link 1) need to be aligned, for example through adding extra padding, with PPDUs transmitted during a restricted TWT SP on another link (e.g., Link 2), then the traffic flow for the low-latency traffic (or latency-sensitive traffic) during a restricted TWT SP on Link 1 can be severely interrupted. This can disrupt the latency-sensitive applications at the client side.

Figure 4:
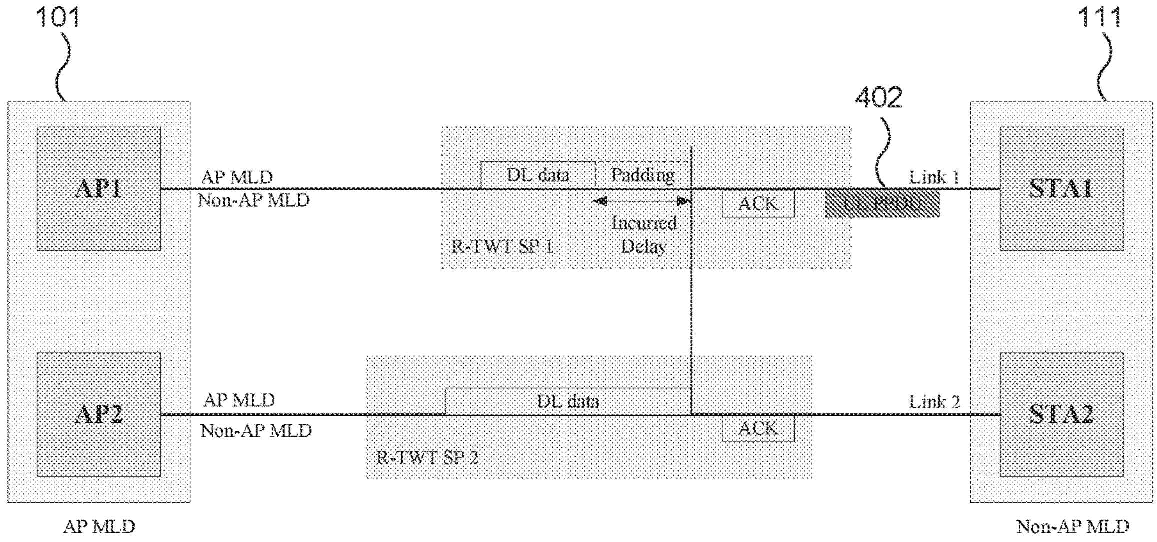
FIG. 4 illustrates an example of incurring delay due to PPDU alignment when multiple restricted TWT SPs are established across multiple links that form an NSTR link pair according to embodiments of the present disclosure.

FIG. 4 illustrates an example of incurring delay due to PPDU alignment when multiple restricted TWT SPs are established across multiple links that form an NSTR link pair according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

In FIG. 4, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. A restricted TWT schedule, Schedule 1, is established on Link 1, and another restricted TWT schedule, Schedule 2, is established on Link 2. The non-AP MLD is an NSTR non-AP MLD, i.e., Link 1 and Link 2 form an NSTR link pair. Moreover, in this illustration, both Link 1 and Link 2 are enabled links.

AP2 transmits a DL PPDU for STA2 on Link 2 during restricted TWT SP 2. Shortly after, AP1 transmits a DL PPDU to STA1 on Link 1 during restricted TWT SP 1. The DL PPDU transmission on Link 1 during rTWT SP 1 finishes earlier than the end time of the DL PPDU transmitted on Link 2 during rTWT SP 2. In order to avoid self-interference at the non-AP MLD, AP1 aligns the end time of DL PPDU on Link 1 during SP 1 with the end time of the DL PPDU on Link 2 during SP 2 (in this illustration, the alignment is performed by appending extra padding within the DL PPDU transmitted on Link 1). However, this alignment of PPDU during SP 1 on Link 1 incurs delay in subsequent frame transmissions during the remainder of the restricted TWT SP 1 on Link 1 (e.g., transmission of the UL PPDU 402). This added delay negatively impacts the latency-sensitive applications of the non-AP MLD, and hence, is not desirable.

If higher priority TIDs are negotiated during the restricted TWT setup phase for the restricted TWT SP on Link 1 as compared to the TIDs negotiated for the restricted TWT SP on Link 2, then the use of padding in the DL PPDU on Link 1 would not be appropriate since it would delay the delivery of higher priority frames (as compared to those of Link 2). Therefore, it would be desirable to use a mechanism to prioritize one TWT SP over another and to prioritize certain TIDs over others.

For the scenario in which a restricted TWT schedule is established on a link (e.g., a first link) between an AP MLD and a non-AP MLD that forms an NSTR link pair with another link (e.g., a second link) between the same AP MLD and non-AP MLD, and the second link also has another restricted TWT schedule established such that the restricted TWT SP on the second link overlaps in time with the restricted TWT SP on the first link, while a UL PPDU is being transmitted during the restricted TWT SP on the first link, if a DL PPDU is being transmitted on the second link during its restricted TWT SP, then the overlapped portions of the UL PPDU and DL PPDU will suffer from self-interference due to NSTR constraints. This may affect latency-sensitive traffic flows during the restricted TWT SPs on both links.

Figure 5:
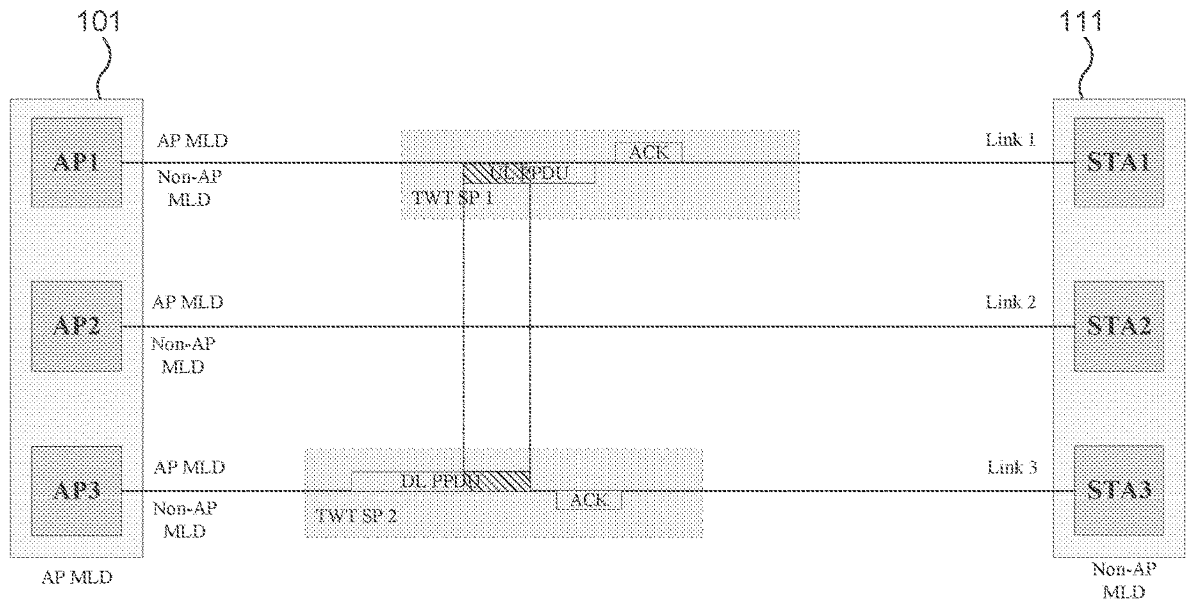
FIG. 5 illustrates an example of NSTR conflict between overlapping UL and DL PPDUs during multiple restricted TWT SPs that are established across multiple links that form an NSTR link pair according to embodiments of the present disclosure.

FIG. 5 illustrates an example of NSTR conflict between overlapping UL and DL PPDUs during multiple restricted TWT SPs that are established across multiple links that form an NSTR link pair according to embodiments of the present disclosure. In this example, the AP MLD may be an AP MLD 101, and the non-AP MLD may be a non-AP MLD 111. Although the AP MLD 101 is illustrated with three affiliated APs (AP1, AP2, and AP3) and the non-AP MLD 111 is illustrated as a single radio non-AP MLD with two affiliated non-AP STAs (STA1, STA2, and STA3), it is understood that this process could be applied with suitable MLDs having any number of affiliated APs or STAs.

In FIG. 5, AP1, AP2, and AP3 are three APs affiliated with the AP MLD. Also, STA1, STA2, and STA3 are three non-AP STAs affiliated with the non-AP MLD. Three links are set up between the AP MLD and the non-AP MLD-Link 1 between AP1 and STA1; Link 2 between AP2 and STA2; and Link 3 between AP3 and STA3. The non-AP MLD is an NSTR non-AP MLD, where Link 1 and Link 3 form an NSTR link pair. Moreover, in this illustration, all links are enabled links.

A restricted TWT schedule (which is not a trigger-enabled TWT schedule) is established on Link 1, and has a corresponding TWT SP, TWT SP 1. While in a trigger-enabled TWT schedule the AP transmits at least one trigger in each TWT SP to schedule its associated STA's transmissions, in a non-trigger-enabled TWT schedule there is no trigger transmitted in any TWT SP, thus allowing the STA to autonomously decide when to transmit inside the TWT SP. Another restricted TWT schedule is established on Link 3, and has a corresponding TWT SP, TWT SP 2.

Since the restricted TWT SP on Link 1 (TWT SP 1) is not a trigger-enabled TWT SP, the AP MLD does not know beforehand at which time during the restricted TWT SP 1 the STA operating on Link 1 (STA1) will transmit a UL PPDU. In this example, AP3 transmits a DL PPDU to STA3 on Link 3 during the restricted TWT SP 2, and this DL PPDU transmission on Link 3 starts before the restricted TWT SP 1 starts on Link 1 and overlaps in time with TWT SP 1 on Link 1. During the restricted TWT SP 1, STA1 transmits a UL PPDU on Link 1 that overlaps in time with the DL PPDU transmitted on Link 3 during restricted TWT SP 2. This overlap causes NSTR interference, which disrupts latency-sensitive traffic flow for both STA1 and STA3.

Based on current specifications, in such a scenario, either of the two STAs operating on the two links should hold off its PPDU transmission until the other STA finishes its PPDU transmission. However, in this case, since both links have a restricted TWT schedule established and since the PPDUs on both links are latency-sensitive, holding off PPDU transmission would disrupt low latency applications for whichever of the r-TWT scheduled STAs does so, and there is no guidance in the specification as to which of the two STAs should hold off its PPDU transmission.

Similar to the scenario of FIG. 4, if higher priority TIDs are negotiated for the restricted TWT SP on Link 1 as compared to the TIDs negotiated for the restricted TWT SP on Link 2, then holding off the PPDU transmission on Link 1 in favor of Link 2 would not be appropriate since it would delay the impact higher priority frames (as compared to those of Link 2). Therefore, it would be desirable to use a mechanism to prioritize one TWT SP over another and to prioritize certain TIDs over others.

According to one embodiment, for the scenario in which a restricted TWT schedule is established on a link (e.g., the first link) between an AP MLD and a non-AP MLD that forms an NSTR link pair with another link (e.g., the second link) between the same AP MLD and non-AP MLD, and the second link also has another restricted TWT schedule established such that the restricted TWT SP on the second link overlaps in time with the restricted TWT SP on the first link, then one of the restricted TWT SPs is prioritized over the other restricted TWT SP in the context of NSTR operation.

According to one embodiment, such prioritization can be made based on the TIDs negotiated for the respective restricted TWT schedules established on the two links during the restricted TWT setup phase. A restricted TWT schedule that has the highest priority TID negotiated is prioritized.

Figure 6:
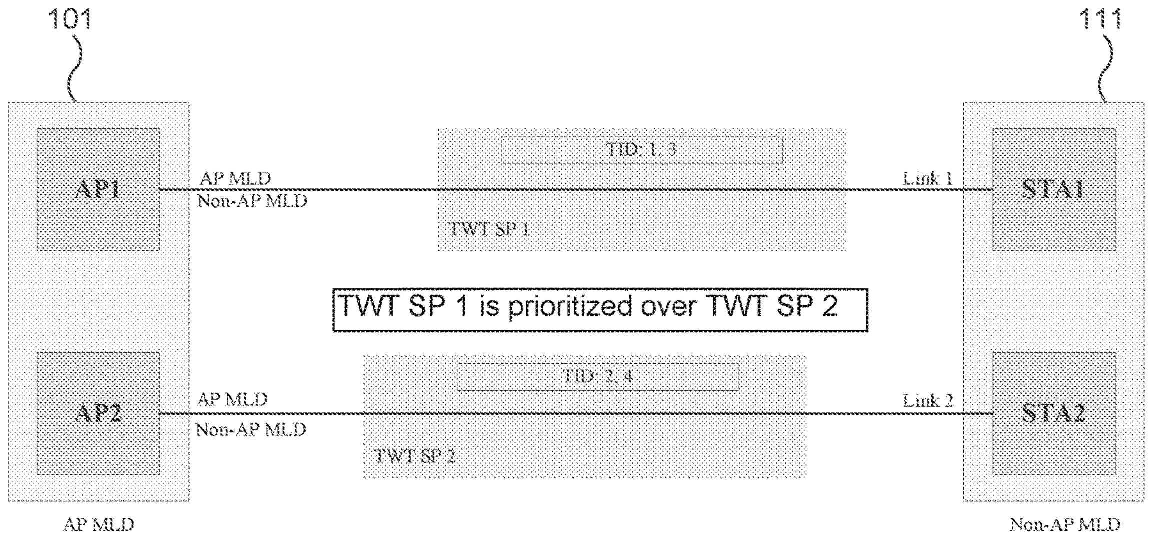
FIG. 6 illustrates an example of TWT SP prioritization based on TIDs negotiated during the restricted TWT Setup phase according to embodiments of the present disclosure.

FIG. 6 illustrates an example of TWT SP prioritization based on TIDs negotiated during the restricted TWT Setup phase according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

In FIG. 6, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. A restricted TWT schedule, Schedule 1, is established on Link 1, and another restricted TWT schedule, Schedule 2, is established on Link 2. The non-AP MLD is an NSTR non-AP MLD, i.e., Link 1 and Link 2 form an NSTR link pair. Moreover, in this illustration, both Link 1 and Link 2 are enabled links.

Based on other information (e.g., a Quality of Service (QoS) Characteristics element) conveyed to the AP MLD by the non-AP MLD, the knowledge of TID priority at the AP MLD, in terms of latency-sensitivity, is as follows (in decreasing order): TID1>TID2>TID3>TID4>TID5>TID6>TID7. Restricted TWT schedule 1 established over Link 1 is negotiated for TID1 and TID3. On the other hand, Restricted TWT schedule 2 established over Link 2 is negotiated for TID2 and TID4.

Since TID1, which has the highest priority, is negotiated for (or mapped on) restricted TWT schedule 1 over Link 1, TWT SP 1 is prioritized over TWT SP 2 in terms of handling conflicts due to NSTR constraints. It is noted that although TID3 is also negotiated for TWT SP 1, and has lower priority than TID2 that is mapped on TWT SP 2, TWT SP 1 would still be prioritized according to this embodiment since TID1 has higher priority than TID2. According to some other embodiments, other TID-based criteria may be used to make a determination as to which TWT SP link should be prioritized over the other.

According to one embodiment, for the scenario in which a trigger-enabled restricted TWT schedule is established on a link (e.g., the first link) between an AP MLD and a non-AP MLD that forms an NSTR link pair with another link (e.g., the second link) between the same AP MLD and the non-AP MLD, and the second link also has another trigger-enabled restricted TWT schedule established such that the restricted TWT SP on the second link overlaps in time with the restricted TWT SP on the first link, then, in order to handle NSTR constraints the r-TWT scheduling AP can dynamically prioritize one TWT SP over the other based on the TIDs negotiated for the respective TWT schedules.

According to this embodiment, for the overlapped trigger-enabled r-TWT SP situation, the r-TWT scheduling AP MLD first triggers a UL PPDU or sends a DL PPDU for the access category (AC) corresponding to the highest priority TID, then triggers a UL PPDU or sends a DL PPDU for the AC corresponding to the second highest priority TID, and so on. The triggering or DL PPDU transmission can happen dynamically across the two TWT SPs on the two NSTR links (i.e., the AP MLD does not have to prioritize one link for the entirety of the TWT SP, but can switch back and forth between links within one TWT SP duration). In the case of triggering a STA (affiliated with a non-AP MLD) for UL PPDU transmission during a restricted TWT SP using a Trigger frame, the corresponding r-TWT scheduling AP (affiliated with the r-TWT scheduling AP MLD) can indicate the desired AC in the Preferred AC subfield of the Trigger-dependent User Info field of the Trigger frame sent to the STA.

Figure 7:
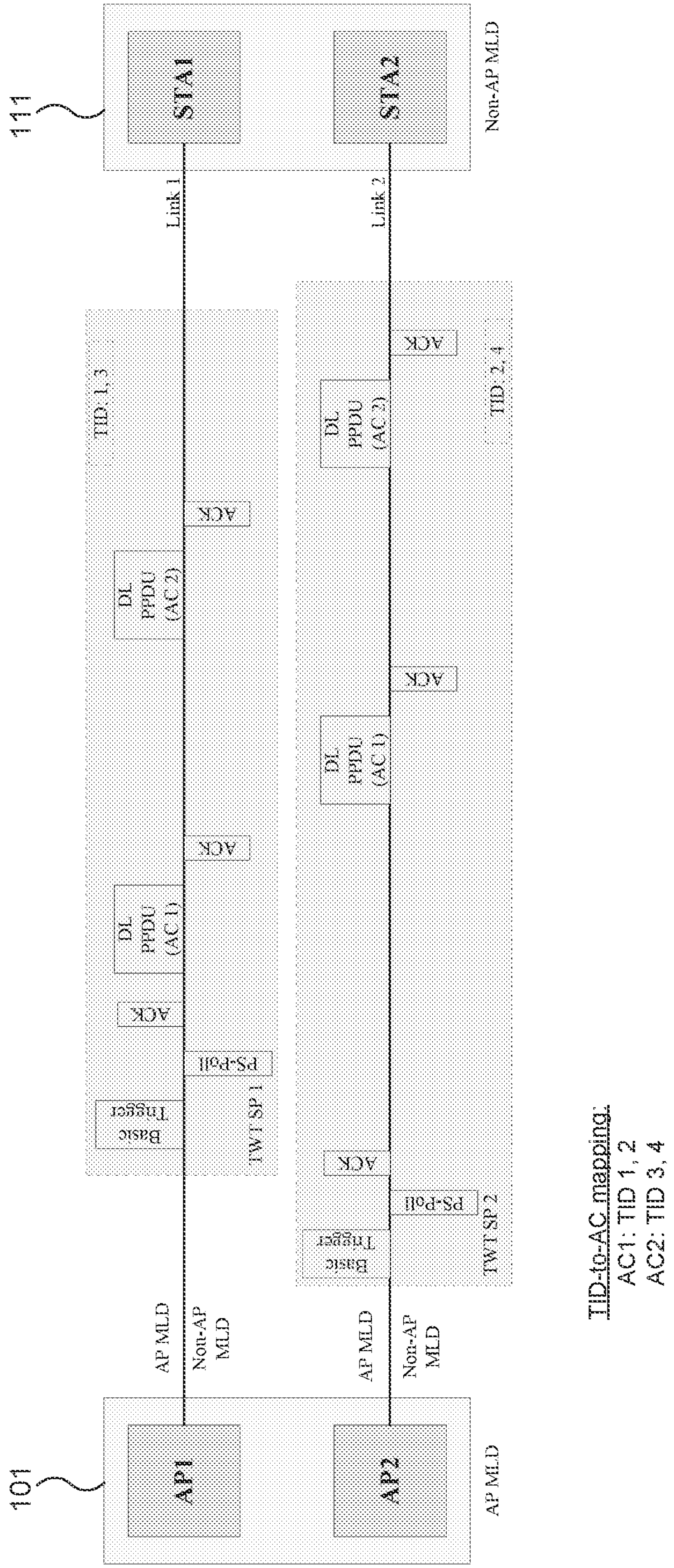
FIG. 7 illustrates an example of dynamic TWT SP prioritization in downlink transmission for trigger-enabled restricted TWT SPs based on TIDs negotiated during the restricted TWT Setup phase according to embodiments of the present disclosure.

FIG. 7 illustrates an example of dynamic TWT SP prioritization in downlink transmission for trigger-enabled restricted TWT SPs based on TIDs negotiated during the restricted TWT Setup phase according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

In FIG. 7, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. A trigger-enabled restricted TWT schedule, Schedule 1, is established on Link 1, and another trigger-enabled restricted TWT schedule, Schedule 2, is established on Link 2. The non-AP MLD is an NSTR non-AP MLD, i.e., Link 1 and Link 2 form an NSTR link pair. Moreover, in this illustration, both Link 1 and Link 2 are enabled links.

Based on other information (e.g., a QoS Characteristics element) conveyed to the AP MLD by the non-AP MLD, the knowledge of TID priority at the AP MLD, in terms of latency-sensitivity, is as follows (in decreasing order): TID1>TID2>TID3>TID4>TID5>TID6>TID7. Restricted TWT schedule 1 established over Link 1 is negotiated for TID1 and TID3. On the other hand, Restricted TWT schedule 2 established over Link 2 is negotiated for TID2 and TID4. The mapping of the TIDs to the ACs are as follows: TID1 and TID2 are mapped to AC1, and TID3 and TID4 are mapped to AC2.

At the beginning of TWT SP 2, AP2 sends a Basic Trigger frame to STA2 over Link 2. In response to the Basic Trigger frame, STA2 sends a PS-Poll frame indicating that it is awake. Shortly thereafter, TWT SP 1 starts on Link 1. During TWT SP1, AP1 sends a Basic Trigger frame to STA1 and in response to the Basic Trigger frame, STA1 sends a PS-Poll frame to AP1 over Link 1.

In this example, since TWT SP 1 has TID1 negotiated for it and TID1 has the highest priority among all of the TIDs, the AP MLD first sends via AP1 the DL PPDU corresponding to AC1 during TWT SP 1 over Link 1. During this transmission on Link 1 the AP MLD does not trigger STA2 for UL transmission on Link 2. Additionally, the AP MLD does not yet have any DL packets waiting at AP2's buffer for STA2. Upon finishing transmission of DL PPDU on Link 1, the AP MLD sends via AP2 a DL PPDU on Link 2 to STA2.

Figure 8:
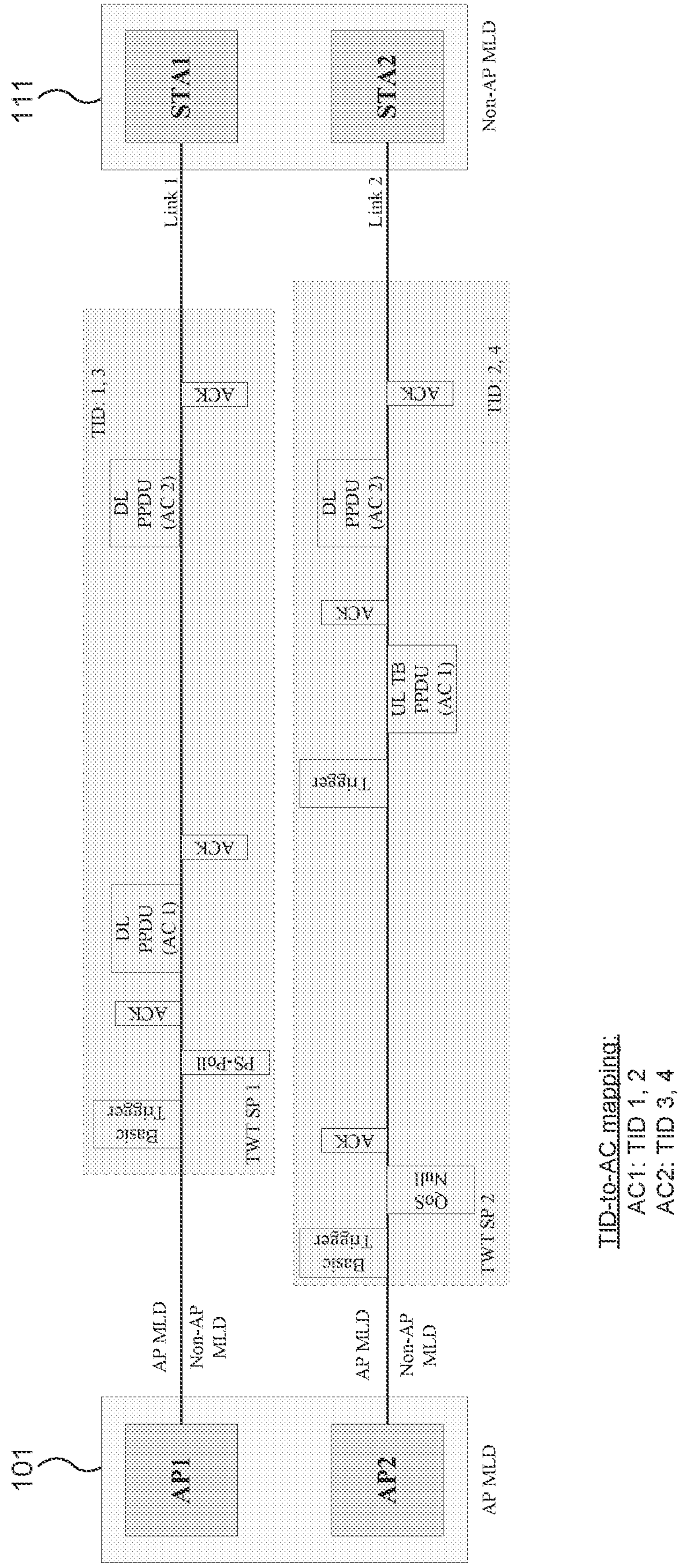
FIG. 8 illustrates an example of dynamic TWT SP prioritization in uplink/downlink transmission for trigger-enabled restricted TWT SP based on TIDs negotiated during the restricted TWT Setup phase according to embodiments of the present disclosure.

FIG. 8 illustrates an example of dynamic TWT SP prioritization in uplink/downlink transmission for trigger-enabled restricted TWT SP based on TIDs negotiated during the restricted TWT Setup phase according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

FIG. 8 illustrates a scenario similar to that of FIG. 7. At the beginning of TWT SP 2, AP2 sends a Basic Trigger frame to STA2 over Link 2. In response to the Basic Trigger frame, STA2 sends a QoS Null frame indicating that it is awake. At the beginning of TWT SP1, AP1 sends a Basic Trigger frame to STA1, and in response to the Basic Trigger frame STA1 sends a PS-Poll frame to AP1 over Link 1.

The AP MLD then sends the DL PPDU corresponding to AC1 over Link 1. Upon finishing the DL PPDU transmission over Link 1 corresponding to AC1, the AP MLD triggers STA2 for UL trigger-based (TB) PPDU transmission over Link 2 using a Trigger frame transmitted to STA2 over Link 2, and indicates AC1 as the Preferred AC in the Trigger-dependent User Info field of the Trigger frame. Accordingly, STA2 sends the UL TB PPDU corresponding to AC1 to AP2 over Link 2. After acknowledging the UL TB PPDU on Link 2, the AP MLD synchronously sends DL PPDUs corresponding to AC2 to both STA1 and STA2 over Link 1 and Link 2, respectively.

According to one embodiment, a variant of the Trigger frame, namely, a UL-TID Trigger frame, can be used in order to enable per-TID-based triggering capability. According to one embodiment, the UL-TID Trigger frame can be used in order to prioritize traffic of one non-AP STA over traffic of another non-AP STA.

Figure 9:
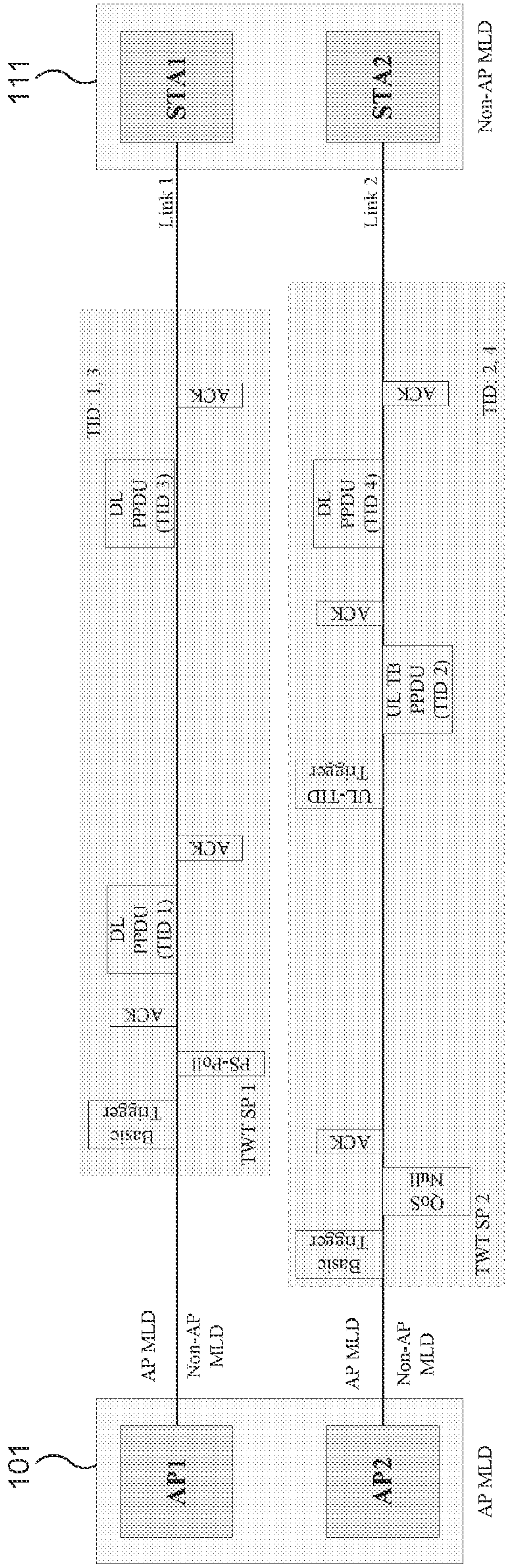
FIG. 9 illustrates an example of the use of a UL-TID Trigger frame to enable triggering specific latency-sensitive TIDs according to embodiments of the present disclosure.

FIG. 9 illustrates an example of the use of a UL-TID Trigger frame to enable triggering specific latency-sensitive TIDs according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

FIG. 9 illustrates a similar scenario to that of FIG. 8. At the beginning of TWT SP 2, AP2 sends a Basic Trigger frame to STA2 over Link 2. In response to the Basic Trigger frame, STA2 sends the QoS Null frame indicating that it is awake. At the beginning of TWT SP1, AP1 sends a Basic Trigger frame to STA1, and in response to the Basic Trigger frame STA1 sends a PS-Poll frame to AP1 over Link 1.

The AP MLD then sends the DL PPDU corresponding to TID1 over Link 1, since TID1 negotiated for TWT SP 1 has the highest priority. Upon finishing the DL PPDU transmission over Link 1 corresponding to TID1, the AP MLD triggers STA2 for UL TB PPDU transmission over Link 2 using a UL-TID Trigger frame transmitted to STA2 over Link 2, and indicates TID2 as the preferred TID in a Preferred TID subfield in the Trigger-dependent User Info field of the UL-TID Trigger frame, since TID2 negotiated for TWT SP 2 has the next highest priority. Accordingly, STA2 sends the UL TB PPDU corresponding to TID2 to AP2 over Link 2. After acknowledging the UL TB PPDU on Link 2, the AP MLD synchronously sends a DL PPDU corresponding to TID3 to STA1 over Link 1 and a DL PPDU corresponding to TID4 to STA2 over Link 2, since TID3 and TID4 have the next highest priorities.

According to one embodiment, for the scenario in which a trigger-enabled restricted TWT schedule is established on a link (e.g., the first link) between an AP MLD and a non-AP MLD that forms an NSTR link pair with another link (e.g., the second link) between the same AP MLD and the non-AP MLD, and the second link also has another trigger-enabled restricted TWT schedule established such that the restricted TWT SP on the second link overlaps in time with the restricted TWT SP on the first link, and if the restricted TWT schedules on both links have negotiated for the same set of TIDs, then in order to handle NSTR constraints the r-TWT scheduling AP MLD can synchronously transmit on both links—for both uplink and downlink.

Figure 10:
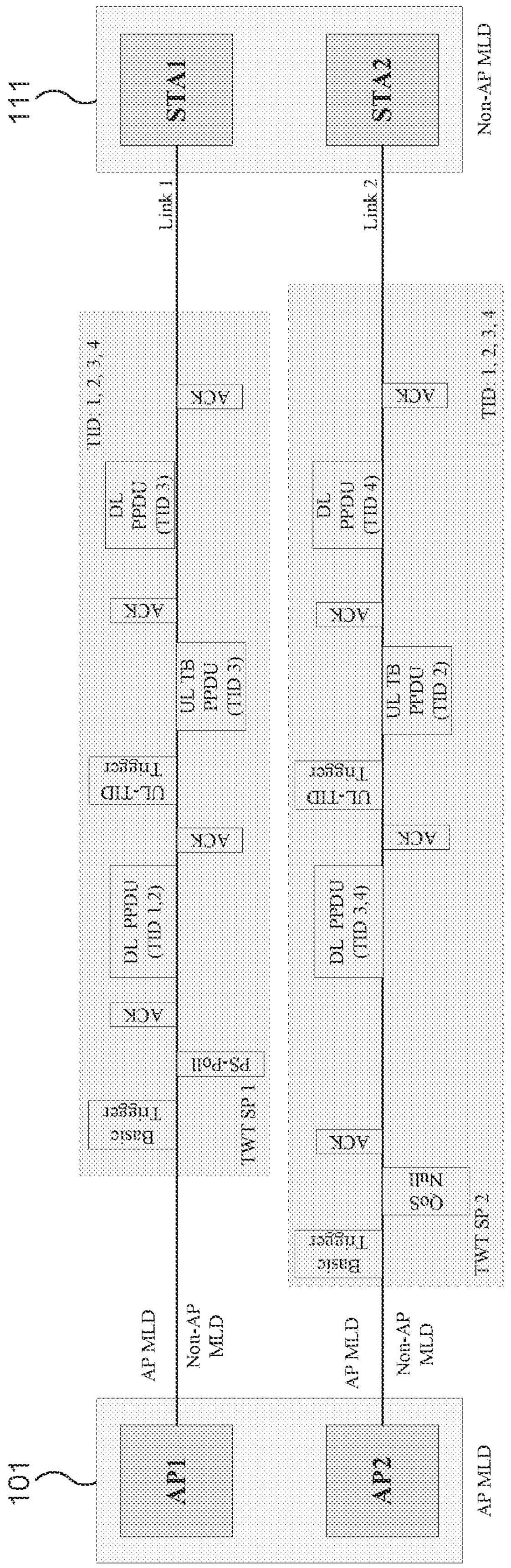
FIG. 10 illustrates an example of synchronous uplink/downlink transmission when the same set of TIDs are negotiated for both trigger-enabled restricted TWT SPs on the two links according to embodiments of the present disclosure.

FIG. 10 illustrates an example of synchronous uplink/downlink transmission when the same set of TIDs are negotiated for both trigger-enabled restricted TWT SPs on the two links according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

FIG. 10 illustrates a similar scenario to that of FIG. 9, except that Restricted TWT schedule 1 established over Link 1 is negotiated for TID1, TID2, TID3, and TID4 and Restricted TWT schedule 2 established over Link 2 is negotiated for TID1, TID2, TID3, and TID4—that is, both restricted TWT schedules are negotiated for the same set of TIDs. At the beginning of TWT SP 2, AP2 sends a Basic Trigger frame to STA2 over Link 2. In response to the Basic Trigger frame, STA2 sends the QoS Null frame indicating that it is awake. At the beginning of TWT SP1, AP1 sends a Basic Trigger frame to STA1, and in response to the Basic Trigger frame STA1 sends a PS-Poll frame to AP1 over Link 1.

The AP MLD then synchronously sends DL PPDUs corresponding to TID1 and TID2 to STA 1 over Link 1, and DL PPDUs corresponding to TID3 and TID4 to STA 2 over Link 2. Upon finishing the synchronous DL PPDU transmissions over Link 1 and Link 2, the AP MLD triggers both STA 1 and STA2 for UL TB PPDU transmissions using UL-TID Trigger frames synchronously transmitted to STA1 over Link 1 and to STA2 over Link 2. In the UL-TID Trigger frame transmitted to STA1, the AP MLD indicates TID3 as the preferred TID in the Preferred TID subfield in the Trigger-dependent User Info field of the UL-TID Trigger frame. In the UL-TID Trigger frame transmitted to STA2, the AP MLD indicates TID2 as the preferred TID in the Preferred TID subfield in the Trigger-dependent User Info field of the UL-TID Trigger frame. Accordingly, the non-AP MLD synchronously sends UL TB PPDUs to the AP MLD—STA1 sends the UL TB PPDU corresponding to TID3 to AP1 over Link 1, and STA2 sends the UL TB PPDU corresponding to TID2 to AP2 over Link 2. After acknowledging the UL TB PPDUs on Link 1 and Link 2, the AP MLD synchronously sends a DL PPDU corresponding to TID3 to STA1 over Link 1 and a DL PPDU corresponding to TID4 to STA2 over Link 2.

Figure 11:
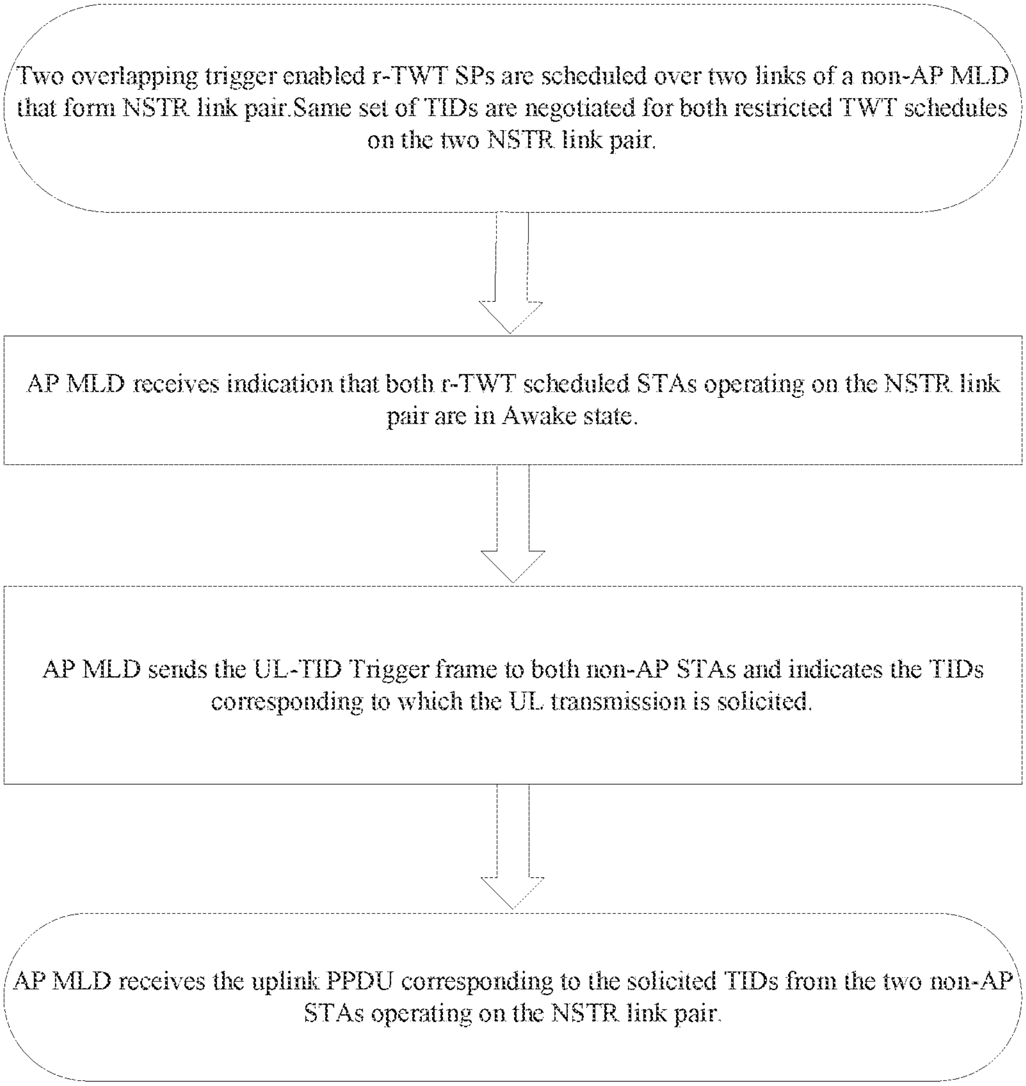
FIG. 11 illustrates an example process of synchronous uplink/downlink transmission when the same set of TIDs are negotiated for both trigger-enabled restricted TWT SPs on the two links according to embodiments of the present disclosure.

FIG. 11 illustrates an example process of synchronous uplink/downlink transmission when the same set of TIDs are negotiated for both trigger-enabled restricted TWT SPs on the two links according to embodiments of the present disclosure. The process of FIG. 11 may correspond to the example of FIG. 10.

According to one embodiment, for the scenario in which a non-trigger-enabled restricted TWT schedule is established on a link (e.g., the first link) between an AP MLD and a non-AP MLD that forms an NSTR link pair with another link (e.g., the second link) between the same AP MLD and the non-AP MLD, and the second link also has another non-trigger-enabled restricted TWT schedule established such that the restricted TWT SP on the second link overlaps in time with the restricted TWT SP on the first link, and if the restricted TWT schedule on the first link has negotiated a higher priority TID than the TIDs negotiated for the restricted TWT schedule on the second link, then the first link is referred to as the r-TWT Priority Link and the second link is referred to as the r-TWT Non-Priority Link for the overlapped portion of the restricted TWT SPs on the two links.

According to one embodiment, during the overlapped portion of the restricted TWT SPs on the two links, uplink transmission on the r-TWT Non-Priority Link will happen only if there is uplink transmission happening on the r-TWT Priority Link. According to another embodiment, during the overlapped portion of the restricted TWT SPs on the two links, downlink transmission on the r-TWT Non-Priority Link will happen only if there is downlink transmission happening on the r-TWT Priority Link.

Figure 12:
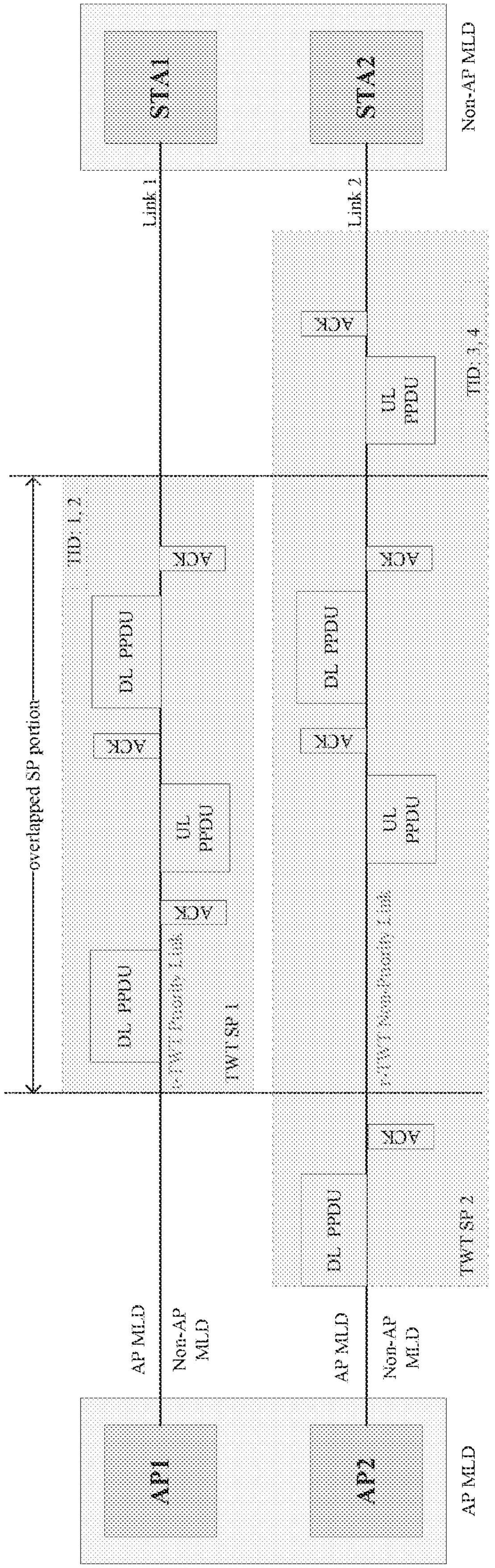
FIG. 12 illustrates an example of operation using an r-TWT Priority Link and a r-TWT Non-Priority Link according to embodiments of the present disclosure.

FIG. 12 illustrates an example of operation using an r-TWT Priority Link and a r-TWT Non-Priority Link according to embodiments of the present disclosure. In this example, the AP MLD may be an AP MLD 101, and the non-AP MLD may be a non-AP MLD 111. Although the AP MLD 101 is illustrated with two affiliated APs (AP1 and AP2) and the non-AP MLD 111 is illustrated as a single radio non-AP MLD with two affiliated non-AP STAs (STA1 and STA2), it is understood that this process could be applied with suitable MLDs having any number of affiliated APs or STAs.

In FIG. 12, AP1 and AP2 are two APs affiliated with the AP MLD. Also, STA1 and STA2 are two non-AP STAs affiliated with the non-AP MLD. Two links are set up between the AP MLD and the non-AP MLD-Link 1 between AP1 and STA1, and Link 2 between AP2 and STA2. A non-trigger-enabled restricted TWT schedule, Schedule 1, is established on Link 1, and another non-trigger-enabled restricted TWT schedule, Schedule 2, is established on Link 2. Non-AP MLD is an NSTR non-AP MLD, i.e., Link 1 and Link 2 form an NSTR link pair. Moreover, in this illustration, both Link 1 and Link 2 are enabled links.

Based on other information (e.g., QoS Characteristics element) conveyed to the AP MLD by the non-AP MLD, the knowledge of TID priority at the AP MLD, in terms of latency-sensitivity, is as follows (in decreasing order): TID1>TID2>TID3>TID4>TID5>TID6>TID7. Restricted TWT schedule 1 established over Link 1 is negotiated for TID1 and TID2. On the other hand, Restricted TWT schedule 2 established over Link 2 is negotiated for TID3 and TID4.

Since TID1, which has the highest priority, is negotiated for restricted TWT schedule 1 over Link 1, then Link 1 is the r-TWT Priority Link and Link 2 is the r-TWT Non-Priority Link. Accordingly, during the overlapped portion of TWT SP 1 and TWT SP 2, the non-AP MLD sends uplink PPDUs on Link 2 only when it is also sending uplink PPDUs on Link 1. Likewise, the AP sends downlink PPDUs on Link 2 only when it is also sending downlink PPDUs on Link 1.

Figure 13:
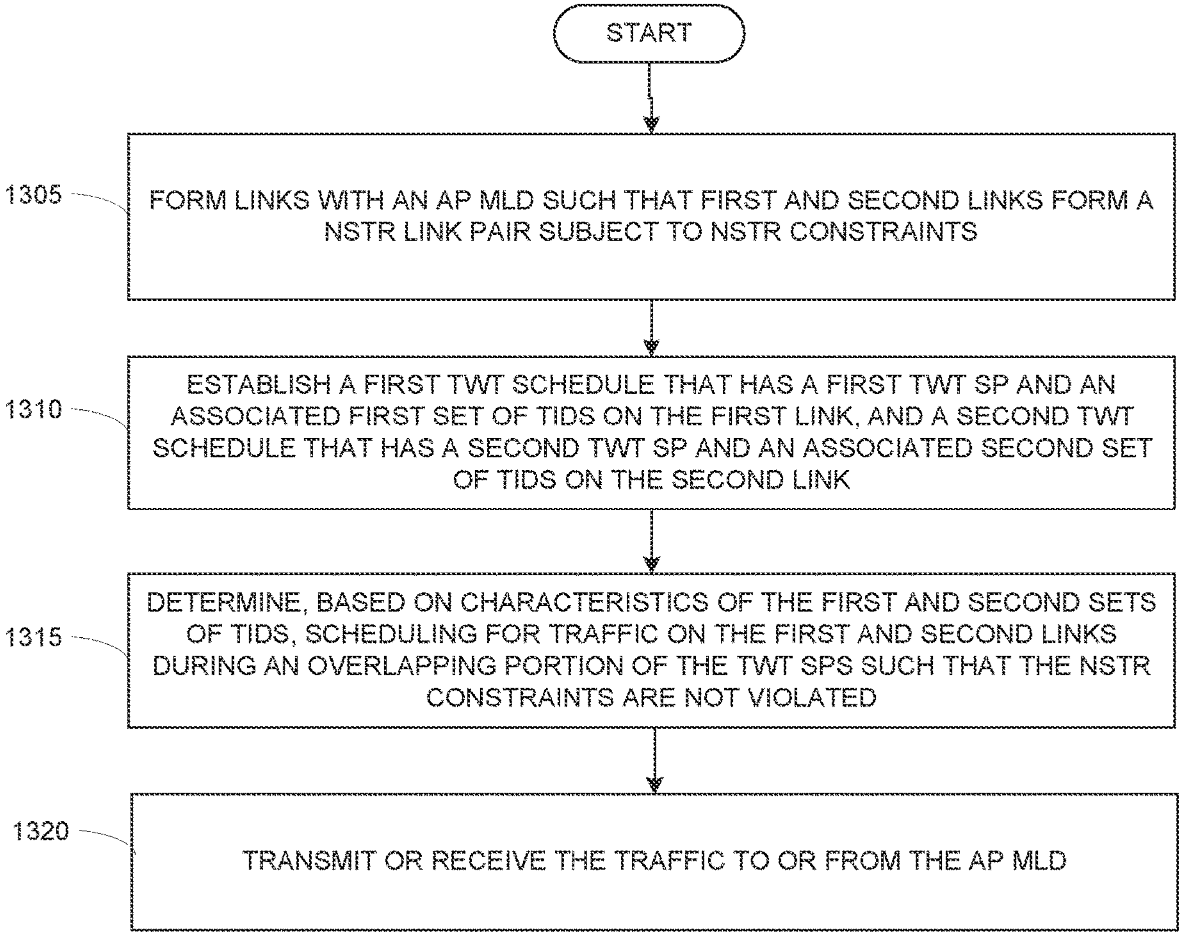
FIG. 13 illustrates an example process for facilitating restricted TWT operation between MLDs across multiple links under NSTR constraints according to various embodiments of the present disclosure.

FIG. 13 illustrates an example process for facilitating restricted TWT operation between MLDs across multiple links under NSTR constraints according to various embodiments of the present disclosure. The process of FIG. 13 is discussed as being performed by a non-AP MLD, but it is understood that a corresponding AP MLD performs a corresponding process. Additionally, for convenience the process of FIG. 13 is discussed as being performed by a WI-FI non-AP MLD comprising a plurality of STAs that each comprise a transceiver configured to configured to form a link with a corresponding AP affiliated with a WI-FI AP MLD. However, it is understood that any suitable wireless communication device could perform these processes.

Referring to FIG. 13, the process begins with the non-AP MLD forming the links with the AP MLD such that first and second links form an NSTR link pair subject to NSTR constraints (step 1305).

Next, the non-AP MLD establishes a first TWT schedule that has a first TWT SP and an associated first set of TIDs on the first link, and establishes a second TWT schedule that has a second TWT SP and an associated second set of TIDs on the second link (step 1310). The first and second TWT SPs have an overlapping portion. Characteristics of the TIDs in the first and second sets of TIDs can include a respective priority of each TID.

The non-AP MLD then determines, based on characteristics of the first and second sets of TIDs, scheduling for traffic on the first and second links during the overlapping portion of the TWT SPs such that the NSTR constraints are not violated (step 1315), before transmitting or receiving the traffic to or from the AP MLD (step 1320).

In some embodiments, the first set of TIDs includes a highest priority TID among TIDs in the first and second sets of TIDs. In some such embodiments, the non-AP MLD at step 1315 may determine, based on the first set of TIDs including the highest priority TID, the scheduling for the traffic such that the traffic on the first link is prioritized to resolve a conflict with the NSTR constraints during the overlapping portion of the TWT SPs.

In some embodiments, the first and second TWT schedules are both trigger-enabled TWT schedules. In some such embodiments, the non-AP MLD at step 1320 may receive, from the AP MLD, a DL PPDU for traffic corresponding to an AC during the overlapping portion of the TWT SPs, where the AC corresponds to the highest priority TID for which traffic is currently buffered at the AP MLD or the non-AP MLD.

In other embodiments in which the first and second TWT schedules are both trigger-enabled TWT schedules, the non-AP MLD as part of step 1315 may receive, from the AP MLD during the overlapping portion of the TWT SPs, a trigger frame including an indication of an AC that corresponds to the highest priority TID for which traffic is currently buffered at the AP MLD or the non-AP MLD. The non-AP MLD may then generate, based on the AC, a UL PPDU for the traffic corresponding to the highest priority TID, and transmit, at step 1320, the UL PPDU to the AP MLD.

In other embodiments in which the first and second TWT schedules are both trigger-enabled TWT schedules, the non-AP MLD as part of step 1315 may receive, from the AP MLD during the overlapping portion of the TWT SPs, a trigger frame including an indication of a first TID that is the highest priority TID for which traffic is currently buffered at the AP MLD or the non-AP MLD. The non-AP MLD may then generate a UL PPDU for the traffic corresponding to the first TID, and transmit, at step 1320, the UL PPDU to the AP MLD.

In other embodiments in which the first and second TWT schedules are both trigger-enabled TWT schedules, the non-AP MLD at step 1320 may receive, from the AP MLD during the overlapping portion of the TWT SPs, a DL PPDU for traffic corresponding to a first TID that is the highest priority TID for which traffic is currently buffered at the AP MLD or the non-AP MLD.

In embodiments in which the first and second TWT schedules are both trigger-enabled TWT schedules and the first and second sets of TIDs include the same TIDs, the non-AP MLD at step 1320 may receive, from the AP MLD on the first link and the second link, first and second DL PPDUs, respectively, at the same time during the overlapping portion of the TWT SPs.

In other embodiments in which the first and second TWT schedules are both trigger-enabled TWT schedules and the first and second sets of TIDs include the same TIDs, the non-AP MLD as part of step 1315 may receive, from the AP MLD on the first link and the second link, a first trigger frame and a second trigger frame, respectively, during the overlapping portion of the TWT SPs. The non-AP MLD may then generate first and second UL PPDUs based on the first and second trigger frames, and at step 1320 may transmit, to the AP MLD on the first link and the second link, respectively, the first and second UL PPDUs, respectively, at the same time during the overlapping portion of the TWT SPs.

In some embodiments, the first and second TWT schedules are both non-trigger-enabled TWT schedules, and the first set of TIDs may include the highest priority TID. The non-AP MLD at step 1315 may determine, based on the first set of TIDs including the highest priority TID, the scheduling for the traffic during the overlapping portion of the TWT SPs such that second DL traffic is scheduled for transmission on the second link only when first DL traffic is scheduled on the first link.

The above flowchart illustrates an example method or process that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multi-link device (MLD) comprising:

stations (STAs) comprising transceivers configured to form links with APs, respectively, the APs affiliated with an AP MLD, wherein:

first and second links of the links form a non-simultaneous transmit/receive (NSTR) link pair subject to NSTR constraints, a first target wake time (TWT) schedule that has a first TWT service period (SP) and an associated first set of traffic identifiers (TIDs) is established on the first link and a second TWT schedule that has a second TWT SP and an associated second set of TIDs is established on the second link, and the first and second TWT SPs have an overlapping portion; and a processor operably coupled to the transceivers, the processor configured to determine, based on characteristics of the first and second sets of TIDs, scheduling for traffic on the first and second links during the overlapping portion of the TWT SPs such that the NSTR constraints are not violated, wherein the TWT SP from a highest-priority TID is prioritized to resolve a conflict with the NSTR constraints during the overlapping portion of the TWT SPs, wherein the processor is further configured to determine the scheduling during the overlapping portion of the TWT SPs by scheduling traffic corresponding to an access category (AC) of a highest priority TID among TIDs in the first and second sets of TIDs is scheduled first, followed by traffic corresponding to an AC of a next highest priority TID, such that the scheduling dynamically alternates between the first and second links within the overlapping portion based on a descending priority order of the TIDs in the first and second sets of TIDs, and wherein at least one of the transceivers is further configured to transmit or receive the traffic to or from the AP MLD.

2. The non-AP MLD of claim 1, wherein the characteristics of the first and second sets of TIDs include a respective priority of each TID.

3. The non-AP MLD of claim 2, wherein:

the first set of TIDs includes a highest priority TID among TIDs in the first and second sets of TIDs, and the processor is further configured to determine, based on the first set of TIDs including the highest priority TID, the scheduling for the traffic such that the traffic on the first link is prioritized to resolve a conflict with the NSTR constraints during the overlapping portion of the TWT SPs.

4. The non-AP MLD of claim 2, wherein:

the first and second TWT schedules are both trigger-enabled TWT schedules, at least one of the transceivers is further configured to receive, from the AP MLD, a downlink (DL) physical protocol data unit (PPDU) for traffic corresponding to an access class (AC) during the overlapping portion of the TWT SPs, and the AC corresponds to the highest priority TID for which traffic is currently buffered at the AP MLD or the non-AP MLD.

5. The non-AP MLD of claim 2, wherein:

the first and second TWT schedules are both trigger-enabled TWT schedules, the at least one transceiver is further configured to receive, from the AP MLD during the overlapping portion of the TWT SPs, a trigger frame including an indication of an AC, the AC corresponds to the highest priority TID for which traffic is currently buffered at the AP MLD or the non-AP MLD, the processor is further configured to generate, based on the AC, an uplink (UL) PPDU for the traffic corresponding to the highest priority TID, and the at least one transceiver is further configured to transmit, to the AP MLD, the UL PPDU.

6. The non-AP MLD of claim 2, wherein:

the first and second TWT schedules are both trigger-enabled TWT schedules, the at least one transceiver is further configured to receive, from the AP MLD during the overlapping portion of the TWT SPs, a trigger frame including an indication of a first TID,
the first TID is the highest priority TID for which traffic is currently buffered at the AP MLD or the non-AP MLD,
the processor is further configured to generate a UL PPDU for the traffic corresponding to the first TID, and
the at least one transceiver is further configured to transmit, to the AP MLD, the UL PPDU.

7. The non-AP MLD of claim 2, wherein:
the first and second TWT schedules are both trigger-enabled TWT schedules,
at least one of the transceivers is further configured to receive, from the AP MLD, a DL PPDU for traffic corresponding to a first TID during the overlapping portion of the TWT SPs, and
the first TID is the highest priority TID for which traffic is currently buffered at the AP MLD or the non-AP MLD.

8. The non-AP MLD of claim 2, wherein:
the first and second TWT schedules are both non-trigger-enabled TWT schedules,
the first set of TIDs includes the highest priority TID, and
the processor is further configured to determine, based on the first set of TIDs including the highest priority TID, the scheduling for the traffic during the overlapping portion of the TWT SPs such that second DL traffic is scheduled for transmission on the second link only when first DL traffic is scheduled on the first link.

9. The non-AP MLD of claim 1, wherein:
the first and second TWT schedules are both trigger-enabled TWT schedules,
the first and second sets of TIDs include the same TIDs, and
a first of the transceivers and a second of the transceivers are further configured to receive, from the AP MILD on the first link and the second link, respectively, first and second DL PPDUs, respectively, at the same time during the overlapping portion of the TWT SPs.

10. The non-AP MLD of claim 1, wherein:
the first and second TWT schedules are both trigger-enabled TWT schedules,
the first and second sets of TIDs include the same TIDs,
a first of the transceivers and a second of the transceivers are further configured to receive, from the AP MLD on the first link and the second link, respectively, a first trigger frame and a second trigger frame, respectively, during the overlapping portion of the TWT SPs,
the processor is further configured to generate, based on the first and second trigger frames, first and second UL PPDUs, and
the first and second transceivers are further configured to transmit, to the AP MLD on the first link and the second link, respectively, the first and second UL PPDUs, respectively, at the same time during the overlapping portion of the TWT SPs.

11. An access point (AP) multi-link device (MHLD), comprising:
APs comprising transceivers configured to form links with stations (STAs), respectively, the STAs affiliated with a non-AP MLD, wherein:
first and second links of the links form a non-simultaneous transmit/receive (NSTR) link pair subject to NSTR constraints,
a first target wake time (TWT) schedule that has a first TWT service period (SP) and an associated first set of traffic identifiers (TIDs) is established on the first link and a second TWT schedule that has a second TWT SP and an associated second set of TIDs is established on the second link, and
the first and second TWT SPs have an overlapping portion; and
a processor operably coupled to the transceivers, the processor configured to determine, based on characteristics of the first and second sets of TIDs, scheduling for traffic on the first and second links during the overlapping portion of the TWT SPs such that the NSTR constraints are not violated, wherein the TWT SP from a highest-priority TID is prioritized to resolve a conflict with the NSTR constraints during the overlapping portion of the TWT SPs,
wherein the processor is further configured to determine the scheduling during the overlapping portion of the TWT SPs by scheduling traffic corresponding to an access category (AC) of a highest priority TID among TIDs in the first and second sets of TIDs is scheduled first, followed by traffic corresponding to an AC of a next highest priority TID, such that the scheduling dynamically alternates between the first and second links within the overlapping portion based on a descending priority order of the TIDs in the first and second sets of TIDs,
wherein at least one of the transceivers is further configured to transmit or receive the traffic to or from the non-AP MLD.

12. The AP MLD of claim 11, wherein the characteristics of the first and second sets of TIDs include a respective priority of each TID.

13. The AP MLD of claim 12, wherein:
the first set of TIDs includes a highest priority TID among TIDs in the first and second sets of TIDs, and
the processor is further configured to determine, based on the first set of TIDs including the highest priority TID, the scheduling for the traffic such that the traffic on the first link is prioritized to resolve a conflict with the NSTR constraints during the overlapping portion of the TWT SPs.

14. The AP MLD of claim 12, wherein:
the first and second TWT schedules are both trigger-enabled TWT schedules,
the processor is further configured to generate a downlink (DL) physical protocol data unit (PPDU) for traffic corresponding to an access class (AC),
the AC corresponds to the highest priority TID for which traffic is currently buffered at the AP MLD or the non-AP MLD, and
at least one of the transceivers is further configured to transmit, to the non-AP MLD, the DL PPDU during the overlapping portion of the TWT SPs.

15. The AP MLD of claim 12, wherein:
the first and second TWT schedules are both trigger-enabled TWT schedules,
the processor is further configured to generate a trigger frame including an indication of an AC,
the AC corresponds to the highest priority TID for which traffic is currently buffered at the AP MLD or the non-AP MLD,
the at least one transceiver is further configured to:
transmit, to the non-AP MLD during the overlapping portion of the TWT SPs, the trigger frame; and receive, from the non-AP MLD, an uplink (UL) PPDU for the traffic corresponding to the highest priority TID, and the UL PPDU is generated based on the AC indicated in the trigger frame.

16. The AP MLD of claim 12, wherein:

the first and second TWT schedules are both trigger-enabled TWT schedules, the processor is further configured to generate a trigger frame including an indication of a first TID, the first TID is the highest priority TID for which traffic is currently buffered at the AP MLD or the non-AP MLD, and the at least one transceiver is further configured to:

transmit, to the non-AP MLD during the overlapping portion of the TWT SPs, the trigger frame; and receive, from the non-AP MLD, a UL PPDU for the traffic corresponding to the first TID.

17. The AP MLD of claim 12, wherein:

the first and second TWT schedules are both trigger-enabled TWT schedules, the processor is further configured to generate a DL PPDU for traffic corresponding to a first TID, the first TID is the highest priority TID for which traffic is currently buffered at the AP MLD or the non-AP MLD, and at least one of the transceivers is further configured to transmit, to the non-AP MLD, the DL PPDU during the overlapping portion of the TWT SPs.

18. The AP MLD of claim 12, wherein:

the first and second TWT schedules are both non-trigger-enabled TWT schedules, the first set of TIDs includes the highest priority TID, and the processor is further configured to determine, based on the first set of TIDs including the highest priority TID, the scheduling for the traffic during the overlapping portion of the TWT SPs such that second DL traffic is scheduled for transmission on the second link only when first DL traffic is scheduled on the first link.

19. The AP MLD of claim 11, wherein:

the first and second TWT schedules are both trigger-enabled TWT schedules, the first and second sets of TIDs include the same TIDs, the processor is further configured to generate first and second DL PPDUs, and a first of the transceivers and a second of the transceivers are further configured to transmit, to the non-AP MLD on the first link and the second link, respectively, the first and second DL PPDUs, respectively, at the same time during the overlapping portion of the TWT SPs.

20. The AP MLD of claim 11, wherein:

the first and second TWT schedules are both trigger-enabled TWT schedules, the first and second sets of TIDs include the same TIDs, the processor is further configured to generate a first trigger frame and a second trigger frame, a first of the transceivers and a second of the transceivers are further configured to transmit, to the non-AP MLD on the first link and the second link, respectively, the first trigger frame and the second trigger frame, respectively, during the overlapping portion of the TWT SPs, and the first and second transceivers are further configured to receive, from the non-AP MLD on the first link and the second link, respectively, first and second UL PPDUs, respectively, at the same time during the overlapping portion of the TWT SPs.

* * * * *